March 9, 1926. 1,576,016
S. H. WEINSTEIN
SEAM PROTECTOR FOR AUTOMOBILE HOODS
Filed April 11, 1924
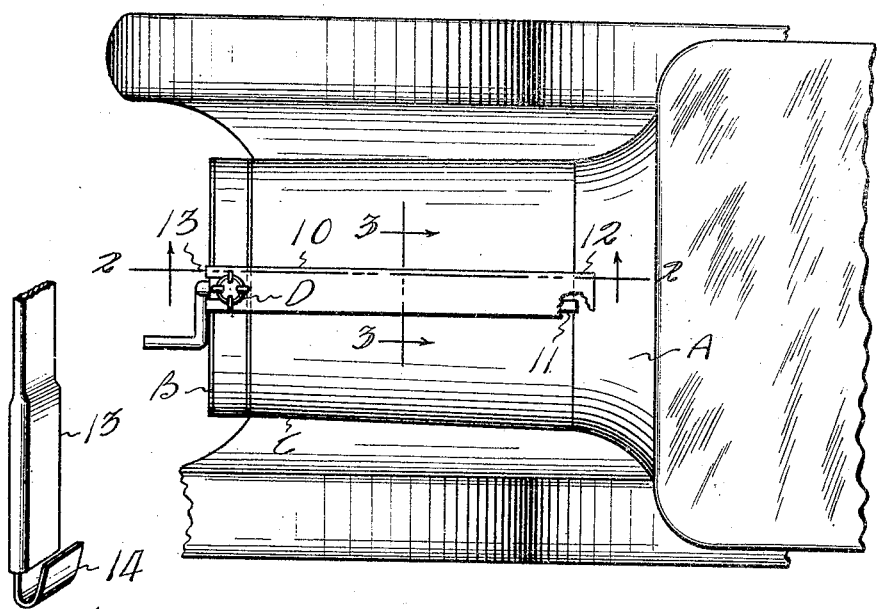
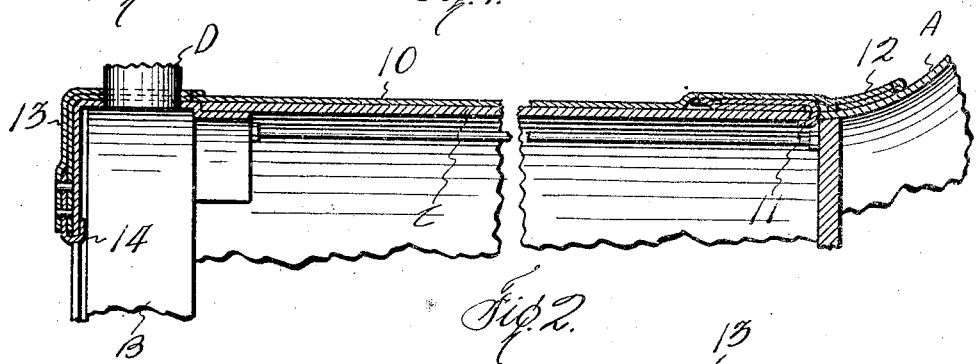
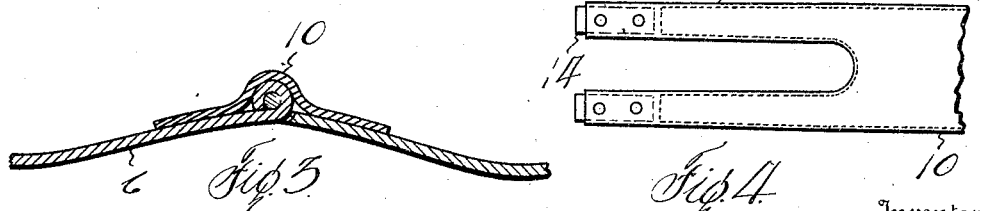
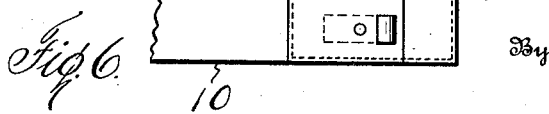
Inventor
S. H. Weinstein
Attorney Patented Mar. 9, 1926.

1,576,016

UNITED STATES PATENT OFFICE.

SOLOMON H. WEINSTEIN, OF DALLAS, TEXAS.

SEAM PROTECTOR FOR AUTOMOBILE HOODS.

Application filed April 11, 1924. Serial No. 705,735.

*To all whom it may concern:*

Be it known that I, SOLOMON H. WEINSTEIN, citizen of the United States, residing at Dallas, in the county of Dallas and State of Texas, have invented certain new and useful Improvements in Seam Protectors for Automobile Hoods, of which the following is a specification.

This invention relates to new and useful improvements in seam protectors for automobile hoods.

The object of the invention is to provide an elongated flexible member for covering the hinge joint or seam of an automobile hood to exclude extraneous matter, such as water, dust and the like.

A particular object of the invention is to provide a seam protector that may be readily and easily attached to the hood.

Another object is provide a flexible protector having hooks or the like whereby it may be engaged with the hood without the use of straps or other unsightly fastenings.

A further object is to provide means for fastening the protector to the hood in such a manner that the said fastenings are substantially concealed.

A construction designed to carry out the invention together with other novel features will be hereinafter more particularly described.

The invention will be more readily understood from a reading of the following specification and by reference to the accompanying drawings, in which an example of the invention is illustrated and wherein:

Fig. 1 is a plan view of the front portion of an automobile equipped with a seam protector constructed in accordance with my invention, Fig. 2 is an enlarged longitudinal sectional view taken on the line 2—2 of Fig. 1.

Fig. 3 is an enlarged cross-sectional view taken on the line 3—3 of Fig. 1,

Fig. 4 is a detail of the front end of the protector,

Fig. 5 is an isometrical view of one of the front hooks, and

Fig. 6 is an under side view of the rear portion of the protector.

In the drawings the numeral 10 designates an elongated strip or band of flexible material. This strip may be made of pantasote, leather or any other water-proof material such as rubber, rubberized fabric etc. The strip is suitably finished and bound along its side edges and has a width sufficient to overlap an ample distance on each side of the hinge joint. Along the hinge joint of many automobiles there are openings through which rain water, dust, dirt and the like will readily enter. In a hard rain enough water will pass through to the motor and ignition system to short circuit the latter, so that the motor will not function.

The strip must not only overlap on each side of the joint or seam, but it must extend over the ends of the same to prevent water blowing thereunder. The strip is made long enough to extend onto the cowl A and over the radiator casing B and down the front of the latter. On the under side of the rear end of strip I mount a pair of hooks 11, spaced so as to engage the inner edge of the hood C on each side of the seam. These are suitably fastened to the strip and are set inwardly from its rear end to form a tab 12 thereat. The tab extends onto and overlies the cowl.

The front end of the strip is bifurcated or otherwise formed to fit around the neck D of the radiator. The furcations or extensions 13 pass on each side of the neck and are long enough to hang down the front of the casing B. Each furcation has a hook 14 suitably fastened on its under side so that it may be engaged under the lower edge of the upper cross member of the radiator casing B.

In applying the protector the hooks 14 are first engaged under the edge of the casing B, the furcations 13 fitting snugly on each side of the neck D and the strip extending up to the neck. By grasping the tab 12 the strip may be pulled rearwardly and the hooks 11 engaged with the rear edge of the hood C. By means of the tab the strip may be readily stretched and when hooked will be taut. As is shown in Fig. 3 the side edges of the strip will lie along the hood in contact therewith. The protector is quickly and easily attached. It is just as easily detached by pulling on the tab to disengage the hooks 11 and then disengaging the hooks 14.

Various changes in the size and shape of the different parts as well as modifications and alterations, may be made within the scope of the appended claims.

What I claim, is:

1. A protector for the hinge seam of a hood comprising an elongated flexible strip having furcations at its front end, inturned hooks fastened to the furcations of the strip and disposed to engage the front of a radiator casing, and an inturned hook fastened to the strip adjacent its rear edge to engage the inner edge of the hood and hold the strip in contact with the hinge seam.

2. A protector as defined by claim 1, and having a tab extending rearwardly from the last mentioned hook.

In testimony whereof I affix my signature.

SOLOMON H. WEINSTEIN.